(12) United States Patent
Qian et al.

(10) Patent No.: US 6,724,940 B1
(45) Date of Patent: Apr. 20, 2004

(54) SYSTEM AND METHOD FOR ENCODING MULTIDIMENSIONAL DATA USING HIERARCHICAL SELF-ORGANIZING CLUSTER VECTOR QUANTIZATION

(75) Inventors: Shen-En Qian, Brossard (CA); Allan B. Hollinger, Toronto (CA)

(73) Assignee: Canadian Space Agency, Saint-Hubert (CA)

( * ) Notice: Subject to any disclaimer, the term of this patent is extended or adjusted under 35 U.S.C. 154(b) by 517 days.

(21) Appl. No.: 09/725,370

(22) Filed: Nov. 24, 2000

(51) Int. Cl.$^7$ .............................. G06K 9/36; G06K 9/46
(52) U.S. Cl. ........................................ 382/253; 382/248
(58) Field of Search ................................ 382/160, 191, 382/225, 232, 248, 253

(56) References Cited

U.S. PATENT DOCUMENTS 4,987,480 A * 1/1991 Lippman et al. ............. 382/253
6,211,971 B1 * 4/2001 Specht ........................ 382/157

OTHER PUBLICATIONS

Ryan, Michael J. and Arnold, John F., "Lossy Compression of Hyperspectral Data Using Vector Quantization," *Remote Sens. Environ.*, Elsevier Science Inc., New York, N.Y., 1997, vol. 61, pp. 419–436.

* cited by examiner

*Primary Examiner*—Phuoc Tran
(74) *Attorney, Agent, or Firm*—Freedman & Associates

(57) ABSTRACT

The present invention relates to a method of encoding a hyper-spectral image datacube using vector quantization. According to the invention, a temporary codebook having a small number, n, of codevectors is generated from the datacube. The datacube is processed using the temporary codebook to form n clusters (subsets) of vectors. A codevector corresponds to a cluster and is the centre of gravity for the cluster. In the compression process, vectors in each cluster are encoded by the corresponding codevector. Then the reconstruction fidelity of the encoded cluster is evaluated. When the fidelity of an encoded cluster is better than a predetermined fidelity, the codevector relating to that cluster is stored in a final codebook and the vectors in the cluster are expressed with the index (address) of the codevector in the final codebook. When the fidelity of an encoded cluster is not suitable, the cluster is reencoded with a new temporary codebook generated from this cluster, and the same process is repeated. The compression process is recursively implemented until all clusters are processed.

36 Claims, 7 Drawing Sheets

SYSTEM AND METHOD FOR ENCODING MULTIDIMENSIONAL DATA USING HIERARCHICAL SELF-ORGANIZING CLUSTER VECTOR QUANTIZATION

FIELD OF THE INVENTION

The invention relates to data compression and more particularly to compression of multidimensional data representations using vector quantisation.

BACKGROUND OF THE INVENTION

The next generation of satellite-based remote sensing instruments will produce an unprecedented volume of data. Imaging spectrometers, also known as hyper-spectral imaging devices, are prime examples. They collect image data in hundreds of spectral bands simultaneously from the near ultraviolet to the short wave infrared, and are capable of providing direct identification of surface materials.

Hyper-spectral data thus collected are typically in the form of a three-dimensional (3D) data cube. Each data cube has two dimensions in the spatial domain defining a rectangular plane of image pixels, and a third dimension in the spectral domain defining radiance levels of multiple spectral bands per each image pixel. The volume and complexity of hyper-spectral data present a significant challenge to conventional transmission and image analysis methods. The raw data rates for transmitting such data cubes can easily exceed the available downlink capacity or on-board storage capacity of existing satellite systems. Often, therefore, a portion of the data collected on board is discarded before transmission, by reducing the duty cycle, reducing the spatial or spectral resolution, and/or reducing the spatial or spectral range. Obviously, in such cases large amounts of information are lost.

For data processing, a similar problem occurs. In computing, a current trend is toward desktop computers and Internet based communications. Unfortunately, the data cubes require a tremendous amount of storage and, for processing functions, the preferred storage is random access memory (RAM). Current desktop computers often lack sufficient resources for data processing of data cubes comprising spectral data.

Recent work related to data compression of multi-spectral and hyper-spectral imagery has been reported in the literature, but most of these studies relate to multi-spectral imagery comprised of only a few spectral bands. These prior art systems for multi-spectral imagery yield small compression ratios, usually smaller than 30:1. There are two reasons for this:

1) the prior art systems do not efficiently remove the correlation in the spectral domain, and
2) the redundancy of multi-spectral imagery in the spectral domain is relatively small compared to that of hyper-spectral imagery.

Gen et al. teach two systems for hyper-spectral imagery. The first system uses trellis coded quantisation to encode transform coefficients resulting from the application of an 8×8×8 discrete cosine transform. The second system uses differential pulse code modulation to spectrally decorrelate data, while using a 2D discrete cosine transform for spatial decorrelation. These two systems are known to achieve compression ratios of greater than 70:1 in some instances; however, it is desirable to have higher compression ratios with simpler coding structures than those reported in the literature.

In an article entitled "Lossy Compression of Hyperspectral Data Using Vector Quantization" by Michael Ryan and John Arnold in the journal *Remote Sens. Environ.*, Elsevier Science Inc., New York, N.Y., 1997, Vol. 61, pp. 419–436, an overview of known general vector quantization techniques is presented. The article is herein incorporated by reference. In particular, the authors describe issues such as distortion measures and classification issues arising from lossy compression of hyper-spectral data using vector quantization.

Data compression using Vector Quantisation (VQ) has received much attention because of its promise of high compression ratio and relatively simple structure. Unlike scalar quantisation, VQ requires segmentation of the source data into vectors. Commonly, in two-dimensional (2D) image data compression, a block with n×m (n may be equal to m) pixels is taken as a vector, whose length is equal to n×m. Vectors constituted in this way have no physical analogue. Because the blocks are segmented according to row and column indices of an image, the vectors obtained in this manner change at random as the pixel patterns change from block to block. The reconstructed image shows an explicit blocking effect for large compression ratios.

There are several conventional approaches to constituting vectors in a 3D data cube of hyper-spectral imagery. The simplest approach is to treat the 3D data cube as a set of 2D monochromatic images, and segment each monochromatic image into vectors independently as in the 2D-image case. This approach, however, does not take full advantage of the high correlation of data in the spectral domain. There is therefore a need for a data compression system that takes advantage of correlation in the spectral domain and of 2D spatial correlation between adjacent image pixels.

The VQ procedure is known to have two main steps: codebook generation and codevector matching. VQ can be viewed as mapping a large set of vectors into a small cluster of indexed codevectors forming a codebook. During encoding, a search through a codebook is performed to find a best codevector to express each input vector. The index or address of the selected codevector in the codebook is stored associated with the input vector or the input vector location. Given two systems having a same codebook, transmission of the index to a decoder over a communication channel from the first system to the second other system allows a decoder within the second other system to retrieve the same codevector from an identical codebook. This is a reconstructed approximation of the corresponding input vector. Compression is thus obtained by transmitting the index of the codevector rather the codevector itself. Many existing algorithms for codebook designs are available, such as the LBG algorithm reported by Linde, Buzo and Gray, the tree-structure codebook algorithm reported by Gray, the self organising feature map reported by Nasrabadi and Feng. Among these, the LBG algorithm is most widely used because of its fidelity. The disadvantages of the LGB algorithm are its complexity and the time burden taken to form the codebook. When the input data is a 3D data cube of hyper-spectral imagery, the processing time can be hundreds of times higher than the normal 2D-image case.

It is, therefore, an object of the present invention to provide a substantially faster codebook generation algorithm with relatively high fidelity for encoding hyperspectral data and the like.

It is another object of the present invention to provide a data compression system for multidimensional data.

SUMMARY OF THE INVENTION

In accordance with the invention there is provided, a method for encoding a hyper-spectral image datacube using vector quantisation, wherein the encoded hyper-spectral data is compressed data, the method comprising the steps of:
  a) determining a codebook having a plurality of codevectors;
  b) encoding each spectral vector of the hyper-spectral data by determining a codevector within the codebook that approximates the spectral vector within the hyper-spectral data;
  c) determining a fidelity of the encoded hyper-spectral data; and,
  d) when the fidelity of a cluster of spectral vectors encoded by a codevector is below a predetermined fidelity, determining another codebook relating to a subset of at least a codevector within the previously determined codebook, encoding each spectral vector within the hyper-spectral data of the cluster that is associated with codevectors within the subset using the other codebook, and returning to step (c).

In accordance with the invention there is provided, a method for encoding a hyper-spectral image datacube using vector quantisation, wherein the encoded hyper-spectral data is compressed data, the method comprising the steps of:
  a) determining a codebook having a plurality of codevectors;
  b) encoding each spectral vector of the hyper-spectral data by determining a codevector within the codebook that approximates the spectral vector within the hyper-spectral data; and,
  c) repeating the steps of:
    determining another codebook relating to a subset of codevectors within the previously determined codebook, encoding each spectral vector within the hyper-spectral data that is associated with codevectors within the subset using the other codebook, until a desired number of codevectors exists within each of the codebooks.

In accordance with the invention there is further provided, a system for encoding a hyper-spectral image datacube using vector quantisation, wherein the encoded hyper-spectral data is compressed data, the system comprising:
  a first port for receiving the hyper-spectral image data;
  a suitably programmed processor for:
    a) determining a codebook having a plurality of codevectors;
    b) encoding each spectral vector of the hyper-spectral data by determining a codevector within the codebook that approximates the spectral vector within the hyper-spectral data;
    c) determining a fidelity of the encoded hyper-spectral data; and,
    d) when the fidelity of a cluster of spectral vectors encoded by a codevector is below a predetermined fidelity, determining another codebook relating to a subset of codevectors within the previously determined codebook, encoding each spectral vector of the cluster of vectors within the hyper-spectral data that is associated with codevectors within the subset using the other codebook, and returning to step (c);
  memory for storing data during execution of steps (a) to (d); and,
  a second port for providing the encoded hyper-spectral data.

In accordance with the invention there is yet further provided, a system for encoding a hyper-spectral image datacube using vector quantisation, wherein the encoded hyper-spectral data is compressed data, the system comprising:
  a first port for receiving the hyper-spectral image data;
  a suitably programmed processor for:
    a) determining a codebook having a plurality of codevectors;
    b) encoding each spectral vector of the hyper-spectral data by determining a codevector within the codebook that approximates the spectral vector within the hyper-spectral data; and,
    c) repeating the steps of:
    b) encoding each spectral vector of the hyper-spectral data by determining a codevector within the codebook that approximates the spectral vector within the hyper-spectral data; and,
    c) repeating the steps of:
      determining another codebook relating to a subset of codevectors within the previously determined codebook, encoding each spectral vector within the hyper-spectral data that is associated with codevectors within the subset using the other codebook,
    until a desired number of codevectors exists within each of the codebooks memory for storing data during execution of steps a) to c); and, a second port for providing the encoded hyper-spectral data.

BRIEF DESCRIPTION OF THE DRAWINGS

Exemplary embodiments of the invention will now be described in conjunction with the drawings in which.

DETAILED DESCRIPTION OF THE INVENTION

In spectral imaging using satellite based hyper-spectral imagers, there is a tremendous amount of data captured that requires transmission to a terrestrial base for analysis and other uses. Typically, it is desirable to compress the captured data before transmitting same to the ground. Unfortunately, this often requires complex and expensive compression hardware. Using the method of the present invention, it is possible to implement a fast data encoding system using commonly available processors that operates in real-time and is suitable to installation on board a satellite system.

Figure 1:
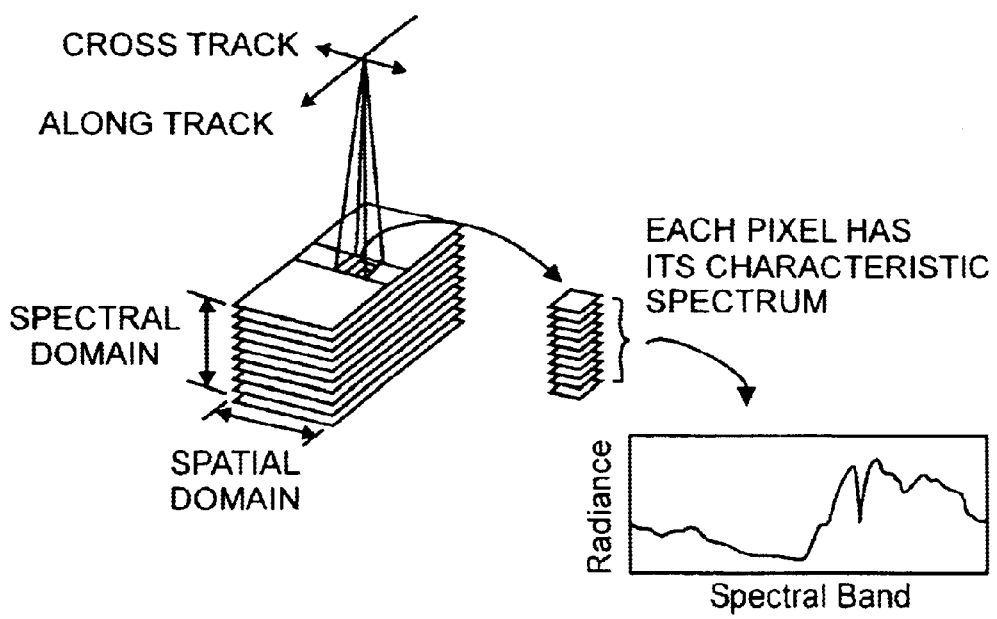
FIG. 1 is a perspective view of a hyper-spectral data cube having two dimensions in the spatial domain defining a rectangular plane of image pixels, and a third dimension in the spectral domain defining radiance levels of hyper-spectral bands for each image pixel.
Figure 2:
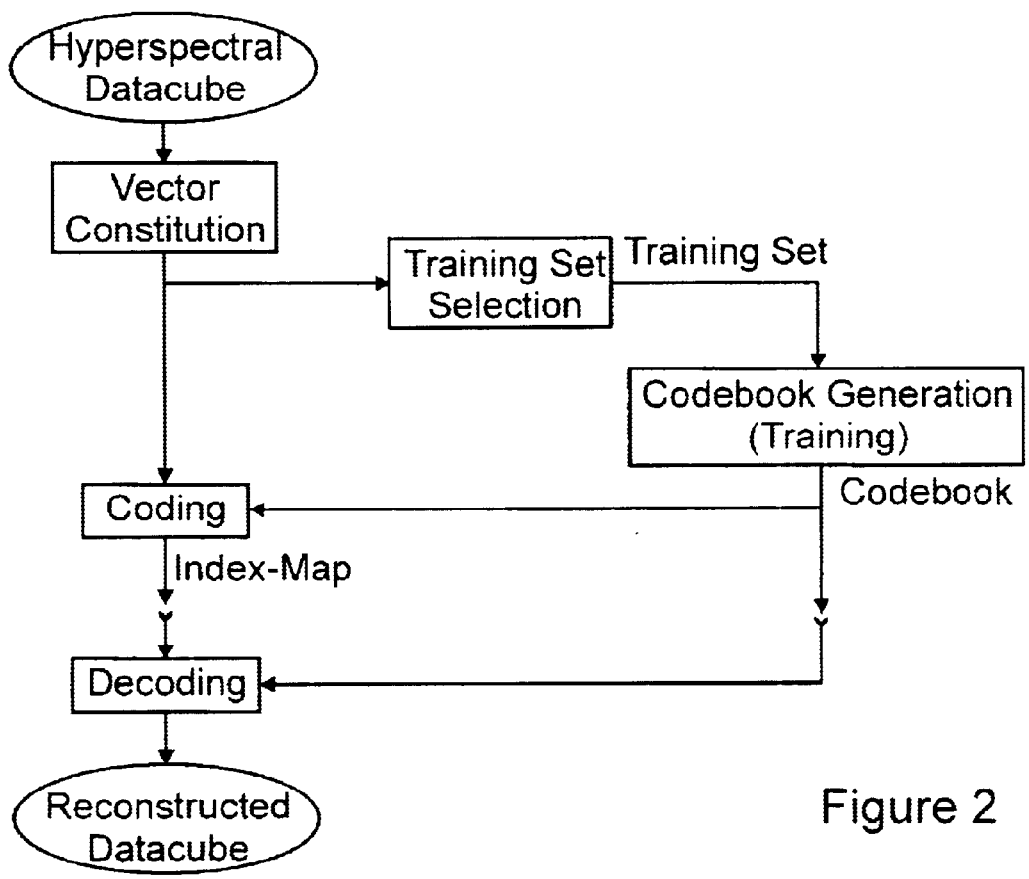
FIG. 2 is a simplified block diagram of a prior art embodiment of a system for compressing, communicating and processing in a compressed form, hyper-spectral image data defining radiance levels of multiple spectral bands per image pixel, said system being initially trained with image data defining a predetermined set of training image pixels.

Referring now to FIG. 1, a hyperspectral data cube is shown. The data is a set of spectral data captured by a hyperspectral imager mounted within a satellite. As such, there is a strong correlation between spectra of similar items such as snow or water. For example, spectra relating to locations wherein snow is found are often similar, but not identical. Encoding of these data in order to compress them can be performed using a vector quantisation (VQ) method. Referring to FIG. 2, a simplified flow diagram of a prior art method of performing vector quantisation is shown. A codebook is generated from a hyperspectral datacube having a known number of codevectors. Generation of a codebook is a time-consuming and difficult task since the ability of the codevectors within the codebook to approximate each vector in the datacube is essential in order to provide compressed data having good fidelity—minimal error. Thus, a set of codevectors within the codebook is selected and compared against vectors in the datacube to ensure that they "best" approximate each vector in some fashion.

Once the codebook is generated, the vectors within the datacube are encoded by replacing each vector with an index of the best matching codevector within the codebook. For example, when a datacube has 1,000,000 vectors and a codebook has 256 codevectors, the resulting compressed data requires memory for 256 vectors being the codebook and 1,000,000 bytes forming the entire array of indices. Even if the codevectors have 100 bytes each, the resulting encoded data requires just over a megabyte while the original data required 100 megabytes. However, though the compression ratio is high, the fidelity may be poor since the compression is lossy. Further, different codebooks will result in different—better or worse—fidelity as noted above.

Figure 3:
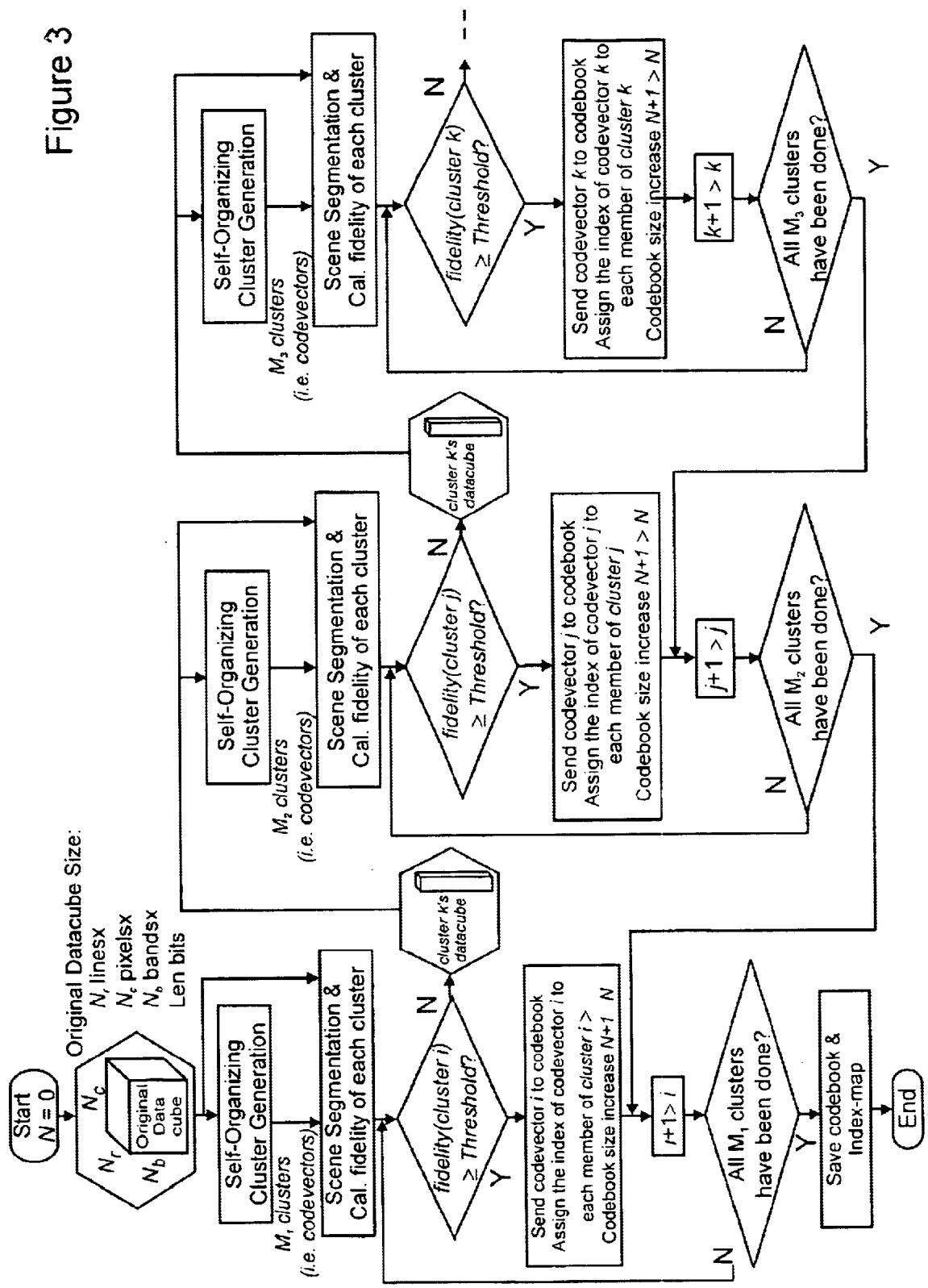
FIG. 3 is a flow diagram of a preferred embodiment of a method for encoding hyper-spectral image data according to the invention.
Figure 4:
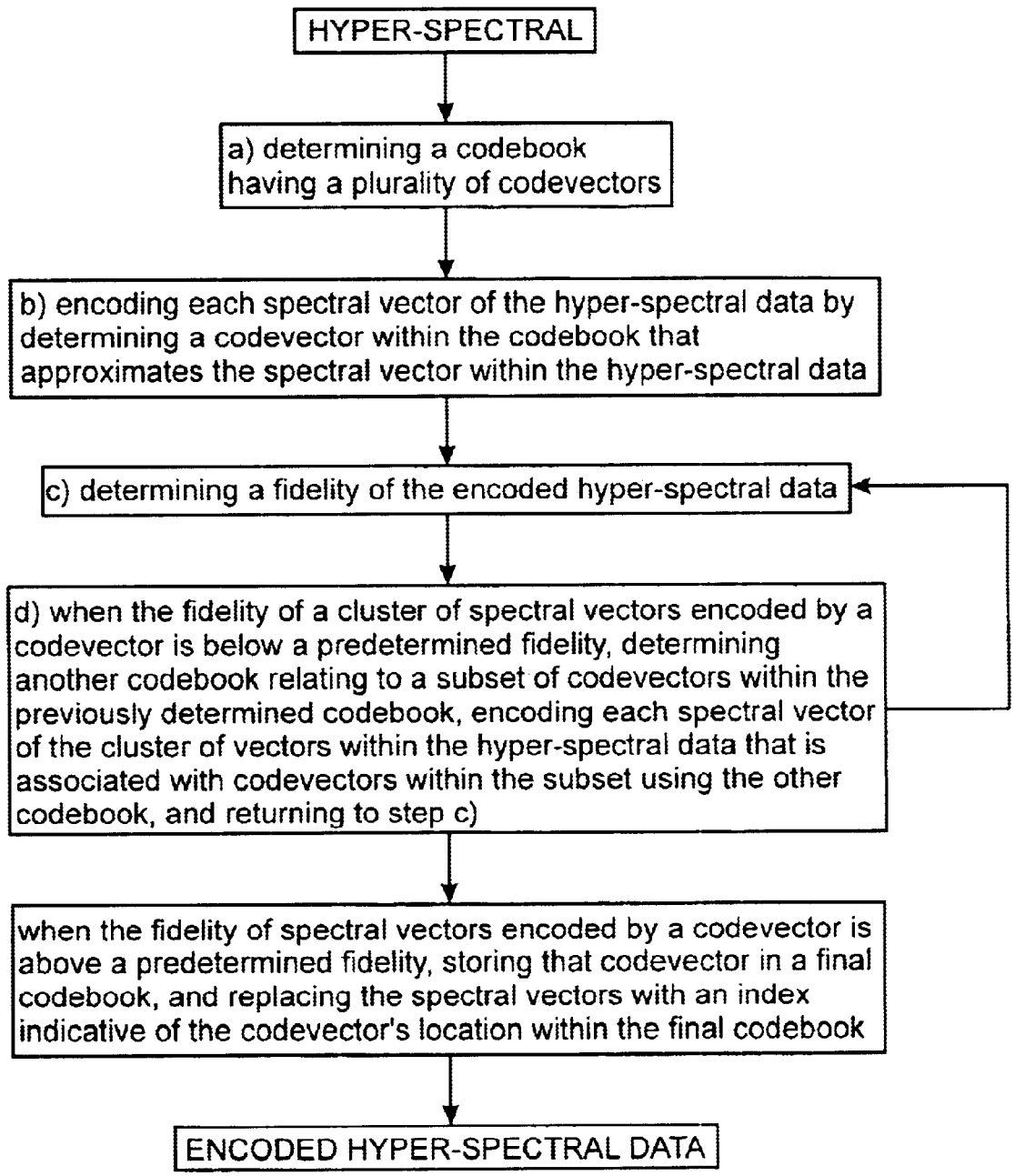
FIG. 4 is a simplified diagram of the method shown in FIG. 3.
Figure 5:
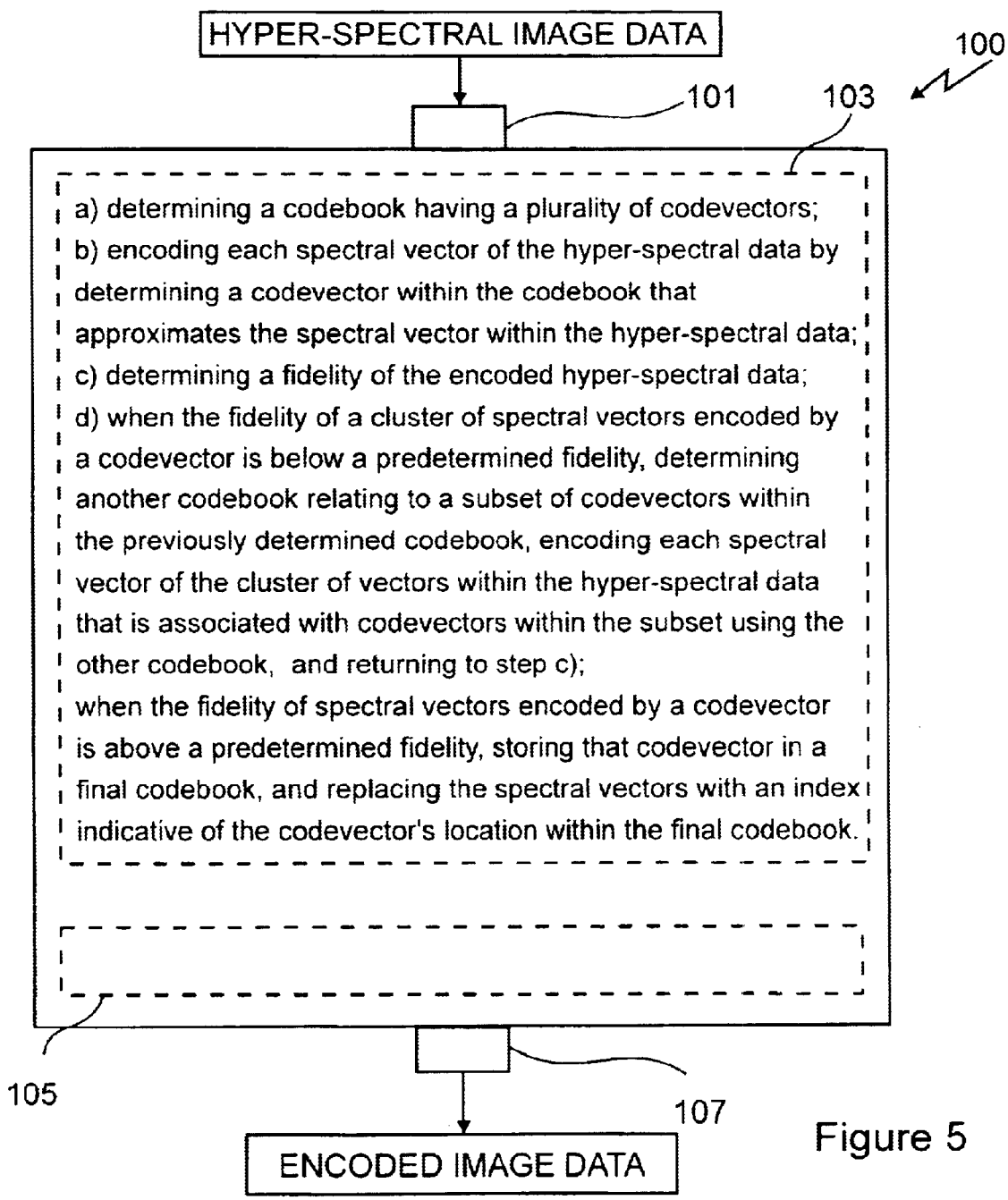
FIG. 5 is simplified diagram of a system for encoding hyper-spectral image data according to the invention.

In order to overcome the shortcomings of the above method a recursive method for encoding hyper-spectral data is disclosed. Referring to FIGS. 3, 4 and 5, a system and a method for encoding hyper-spectral data according to the invention is shown. The entire hyper-spectral datacube is provided via port 101 as the input to processor 103 for recursive processing as shown in FIGS. 3 and 4. Memory 105, preferably RAM, is provided to store data during the recursive processing.

First, a temporary codebook having a small number of codevectors is generated from the entire hyper-spectral datacube. A codevector in the codebook corresponds to a cluster of spectral vectors and is the gravity center of the cluster. The codebook typically has less than 16 codevectors. Selection of such a codebook to accurately reflect the vectors of a given datacube is unlikely and as such, less care needs to be taken to ensure high fidelity of the results in a given pass. Optionally, sampling is performed on a small percentage of spectral vectors within the hyper-spectral data and a set of codevectors is determined for reasonably approximating the sampled vectors.

Next, the spectral vectors of the hyper-spectral datacube are encoded using the small codebook. A fidelity is evaluated for each of the vectors which are encoded by a codevector in the codebook. The fidelity is related to a closeness between the encoded vectors—real data—and the codevector with which the data was encoded.

When a fidelity of a cluster of vectors encoded by a codevector is above a predetermined threshold, that codevector is sufficient and is stored in the final codebook. The vectors encoded by that codevector are replaced with an index indicative of the codevector's location within the final codebook.

When a fidelity evaluation is below the predetermined threshold, the cluster of spectral vectors is provided to the recursive block for another iteration. The cluster of spectral vectors encoded by the codevector is then reencoded with a new small codebook containing a subset of codevectors, which is generated from that cluster of spectral vectors. The subset of codevectors may contain only one codevector or a plurality of codevectors. The new small codebook results in improved fidelity. The recursive process is continued until each codevector yields a fidelity above a predetermined threshold. This recursive process guaranties that an encoded hyper-spectral datacube has a fidelity above the threshold and, furthermore, each encoded spectral vector within the hyper-spectral datacube has a fidelity above the threshold.

Once all clusters have a fidelity that is better than the predetermined fidelity, the recursion stops since no more clusters remain as inputs to the recursive block. At this point, the final codebook has a number of codevectors, each spectral vector is now associated with a codevector of the final codebook and the fidelity with which each codevector is associated with its cluster of vectors is known to be better than the predetermined fidelity. Each spectral vector is then replaced with an index indicative of the codevector's location within the final codebook. The encoded hyper-spectral data—the indices of the encoded spectral vectors and the final codebook—are then provided to port 107 for transmission.

To generate a small codebook is not a laborious task since it is selected to best classify the vectors of the datacube into clusters and does not necessarily provide a "best" fidelity. Because the size of the codebook generated at each recursion is small, and the number of vectors in each cluster becomes smaller and smaller with increasing number of recursions, the process is very rapid and, therefore, advantageous. For example, this method allows processing of the data in near real time while mapping a surface area. Further, the resulting codebook is guaranteed to provide better than the predetermined fidelity for each encoded cluster and not only for the entire datacube. Thus, for each codevector, it is known that the data is well selected. Finally, the recursive method is applicable regardless of the desired fidelity. For example, setting the compression fidelity to a level better than that of the spectrometer with which the data is captured can result in a near lossless compression or a lossless compression in the sense of taking into account the instrument noise. Setting the predetermined fidelity level to a worse fidelity results in increased compression at that fidelity level or better. Though higher values of predetermined fidelity result in more processing time because further recursions are required, the increase is not so substantial such that the tradeoff is mainly between fidelity and compression ratio.

Though the above method is described with relation to recursion, it could be implemented in an iterative fashion as well. This is evident to those of skill in the art. Also, instead of dealing with each codevector independently, it is also possible to group codevectors having insufficiently high fidelities together to form a subset. Each codevector is then replaced with a set of codevectors and a single encoding step is performed for the entire subset. Of course, since the codevectors are already representative of known sets of vectors, such a method is less efficient than the one described herein.

The compressed data—index map—produced by this compression technique actually is a classification of the hyper-spectral datacube. In addition the clusters in the index map are well ordered. Similar clusters have close class numbers. Moreover, controlling the fidelity of compression can be used to control the accuracy of the classification. That is a unique property of which a supervised and/or an unsupervised classification method are not possessed. The processing time to compress a datacube using HSOCVQ is faster than that required for classifying the datacube using a supervised or an unsupervised classification method. The HSOCVQ is useful as an alternative classification method.

When classification based on particular spectral channels is desired, the method with small modifications supports such an application. For example, if classification is to be based on channels $a_0 \ldots a_i$ as a first classification hierarchy and $b_0 \ldots b_j$ as a second classification hierarchy—classify by a first and then by b within a—then the method is employed for only channels $a_0 \ldots a_i$ in a first stage. The first stage continues through iterations until classification fidelity is sufficient. Alternatively, only one iteration per classification hierarchy is performed. Because the method is being applied to only a subset of channels, it typically converges faster and executes in less time. Once the first stage is completed, the channels $b_0 \ldots b_j$ are added to the data for which the method is employed. Once again, the method typically converges rapidly for a small subset of channels. Once the second stage is completed, the remaining channels are also considered in accordance with the present method.

Since only a subset of channels is considered in each of the first and second stages, the classification that results is heavily weighted to classify the data based on that subset.

An exemplary use of hierarchical classification is as follows. When a spectrometrric instrument is known to have more error in data captured on some channels than on others whether because of external effects or apparatus limitations, those channels are selected to be in a lowest classification order such that classification is not heavily weighted by error data. Since much of the data reconstruction error will be focused in those channels evaluated last, such a method allows for compression of spectral channels with less error more accurately than those with substantial error. Further, if the channels representative of error data are known a priori, such a method invokes little or no penalty in performance or data reconstruction quality. In fact, it is likely to improve both.

With this compression technique, small objects and small clusters are well preserved after compression if an appropriate threshold is selected. Setting the compression fidelity to a level better than that of the instrument with which the data is captured results in a near lossless compression or a lossless compression in the sense of taking into account the instrument noise.

Figure 6:
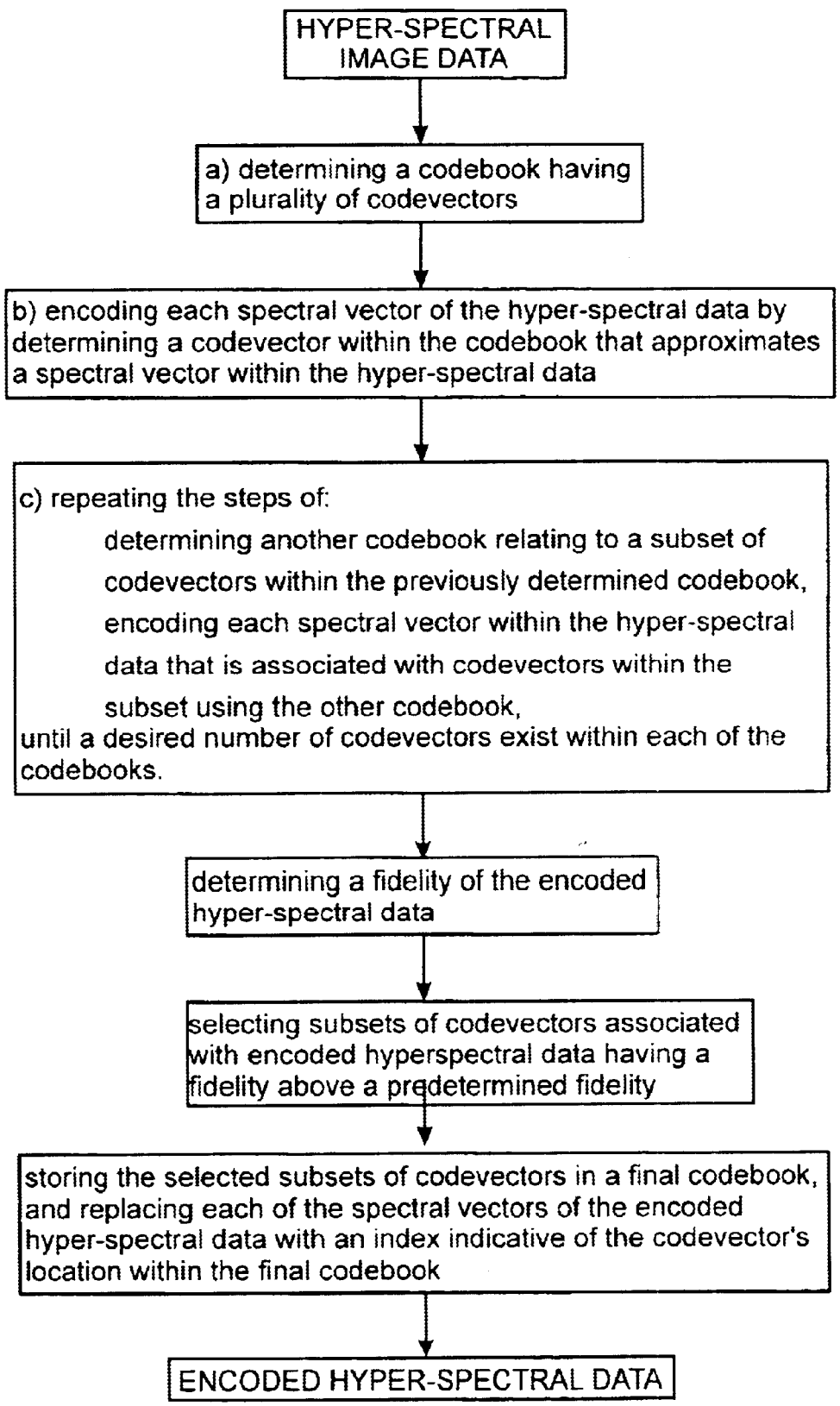
FIG. 6 is simplified diagram of another method for encoding hyper-spectral image data according to the invention.
Figure 7:
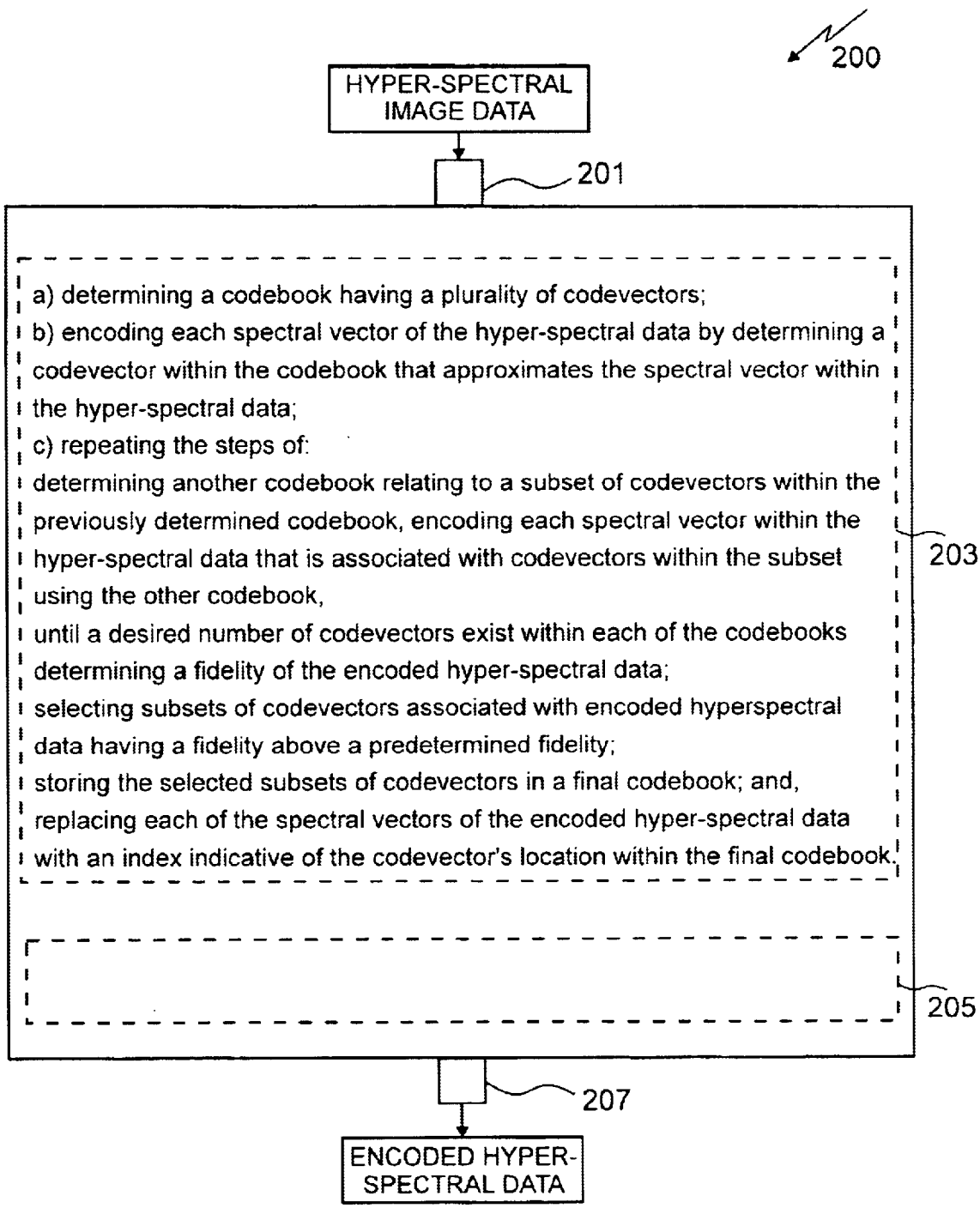
FIG. 7 is simplified diagram of another system for encoding hyper-spectral image data according to the invention; and, FIG. 8 is simplified diagram of another system for encoding hyper-spectral image data according to the invention.

Referring to FIGS. 6 and 7, another system and method for encoding hyper-spectral data according to the invention is shown. The hyper-spectral datacube is provided via port 201 as the input to processor 203 for recursive processing as shown in FIG. 6. Memory 205, preferably RAM, is provided to store data during the recursive processing. This method differs from the method disclosed above in that the fidelity of the encoded spectral vectors is not determined during the recursive process. Each cluster of spectral vectors encoded by a codevector of the initial small codebook is reencoded with a new small codebook, which is generated from that cluster of spectral vectors. The new small codebook results in improved fidelity. This step is then repeated until a desired number of codevectors exist within each of the codebooks. After the recursive process is finished for all clusters a fidelity of the encoded hyper-spectral data is determined and subsets of codevectors associated with encoded hyper-spectral data having a fidelity above a predetermined fidelity are selected. Finally, the selected subsets of codevectors are stored in a final codebook, and each of the spectral vectors of the encoded hyper-spectral data is replaced with an index indicative of the codevector's location within the final codebook. The encoded hyper-spectral data—the indices of the encoded spectral vectors and the final codebook—are then provided to port 207 for transmission.

By avoiding the determination of the fidelity during the recursive process this method can be executed as a straightforward iteration and is, therefore faster than the above method. Of course, because no fidelity is determined, this method fails to weight the encoding process in order to achieve improved fidelity and, as such, is less preferred.

Figure 8:
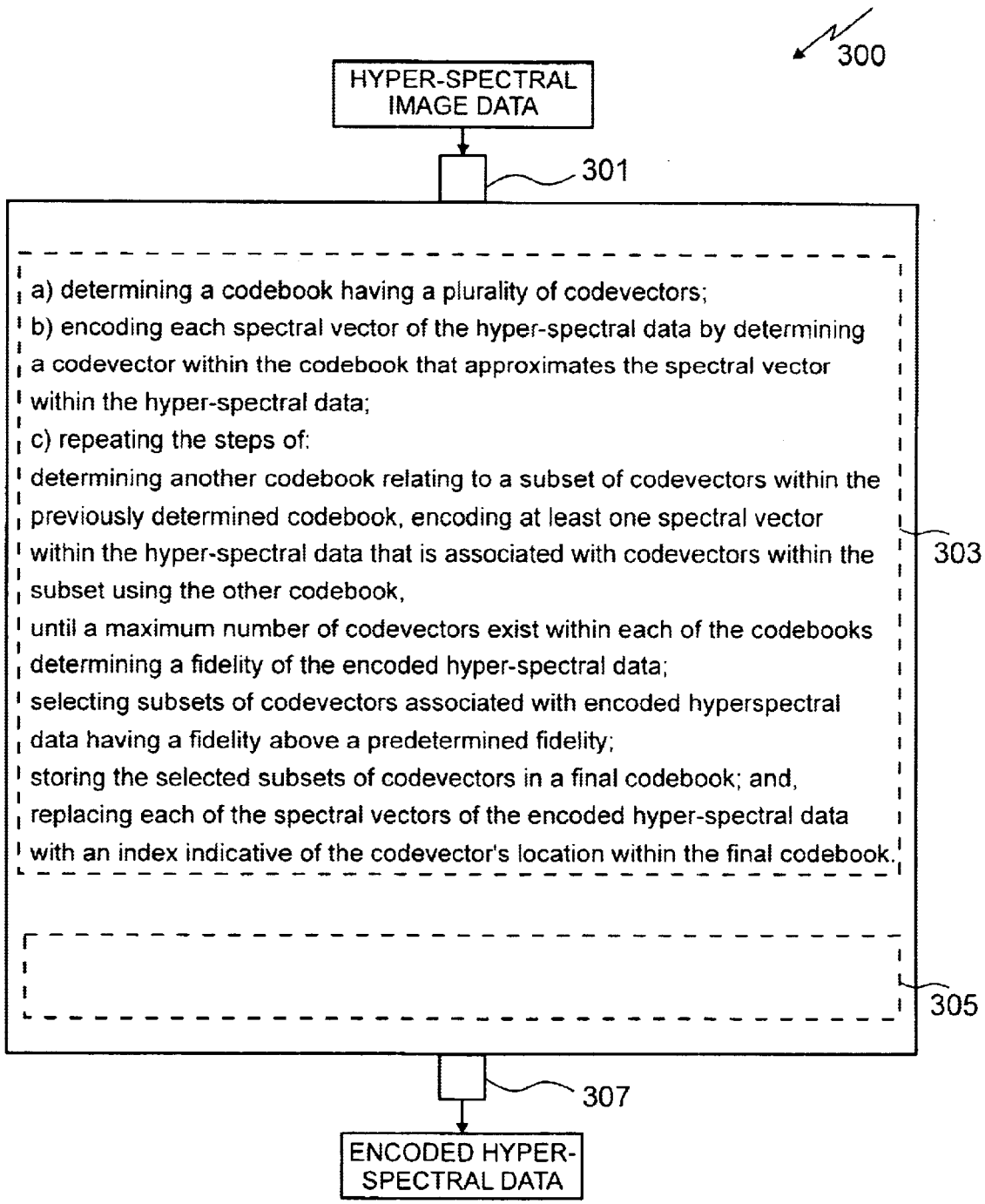

Referring to FIG. 8, an embodiment of the invention using iteration instead of recursion is shown. Here, during each iteration at least one cluster is reencoded. It is possible to reencode all clusters having a fidelity below the threshold fidelity or a subset of those clusters. During a subsequent iteration, a larger number of clusters exist and the process repeats itself. The iterations stop when convergence occurs or when another indicator is determined. For example, a maximum number of clusters is reached. Though the method is shown iteratively, it results in very similar results to those of the method of FIG. 3.

According to another method, only a cluster with a worst fidelity is reencoded during each pass. Therefore, after each pass, all clusters are known to have better than the worst fidelity determined in a previous pass. Such an algorithm converges toward an overall better fidelity with each pass and can be terminated after a number of iteration, when a worst fidelity is above a predetermined threshold, when a number of clusters is encoded with at least a predetermined fidelity and so forth. For example, if the method is stopped when 4096 clusters exist, a codebook, having 4096 codevectors result, wherein the codevectors represent the original data with a fidelity of at least that of the worst fidelity for a cluster. Since the cluster encoded with a worst fidelity is reencoded each pass, such a method avoids the problem of reencoding better clusters merely because they are encoded with a fidelity below a given threshold. For example a cluster with a fidelity F below the fidelity $F_{threshold}$ is typically reencoded. If the process is halted when 4096 codevectors exist, there may remain clusters with fidelities of below F. If the cluster with a worst fidelity of encoding is reencoded first this is not the case.

As is evident to those of skill in the art, the present invention does not rely on geometric clustering of spectra. Instead, clustering is performed using a classification system to result in clusters of similar spectra. This results in error that is randomly distributed throughout the hyperspectral data and not spatially expressed therein. In contrast, most prior art systems rely on geometric subsampling and thereby often result in spatially expressed errors in the reconstructed data. Prior art systems rely on classification of specific groups of spectral channels whereas the present invention relies on classification of all spectral channels simultaneously when so desired.

Alternatively or in conjunction, algorithms are employable which predict convergence of the method and error likelihood in the process. The use of predictive algorithms allows the a system to balance performance in terms of processing resource usage and performance based on compression ratio and performance based on compressed data fidelity. These three performance indicators are often difficult to balance in a lossy compression system.

Though in the above description, the exact method of determining codevectors within a codebook is not disclosed, there are many such methods in the prior art. Any such method is applicable to the present invention. Preferably, such a method is applied in a more time efficient fashion that risks fidelity in order to improve performance. Since fidelity will be improved in further stages, the fidelity of each individual stage is less significant than with the prior art.

For example, a method of fast vector quantisation involves a step of training set sub-sampling. Such a method, when integrated into the present inventive method, results in significant advantages. It is generally known that to generate a given size codebook the Codebook Generation Time (CGT) is proportional to the size of the training set. The CGT at each stage of the present inventive method is improved by a factor of approximately 1/sampling rate (SR), if the training set is sub-sampled at a rate of SR. For example, if the training set consists of only 2% of the vectors within the datacube, the CGT is improved by a factor of approximately 50. For an iterative or recursive method such as the present invention, the speed improvement is very significant since numerous codebooks are generated in the vector quantisation of a single datacube.

Of course, since the method generates small codebooks representative of classifications, sampling of spectral vectors is also useful in the classification when spectral location is a significant factor in the classification process.

The overall processing time of the present algorithm with sub-sampling is comparable to the fastest Multiple Sub-Codebook Algorithm (MSCA). The processing times are similar. Since for both algorithms the codebook generation time decreases when the training set size and the codebook size are reduced, this is expected. Further, the coding time is reduced when the codebook size is decreased. The distinguishing feature of the present invention is a resulting improved fidelity, improved compression ratio, and an ability to selectively trade-off between these two measures of performance.

Of course, the present invention will also function with any of a variety of methods of codebook generation such as the LBG method, the Spectral Feature Based Binary Coding method, and MSCA.

Also, during an encoding step, the SFBBC method and the Correlation Vector Quantization (CVQ) method are suitable alternatives to the LBG algorithm. When using MSCA, it is suitable for replacing both the codebook generation and the encoding steps.

Selection of codebook generation techniques and of encoding techniques within the framework of the inventive method is a matter for one skilled in the art based on design parameters relating to system performance and based on their available working program code. For example, someone with working code for performing MSCA may choose to use MSCA for both steps to obviate a need to further develop encoding and codebook selection code, thereby speeding up time to market. Of course, numerous parameters effect selection of techniques within the inventive method. This is evident to those of skill in the art.

According to an embodiment of the invention a fixed fidelity is provided at an outset of the compression process. For example, the fidelity is provided as a signal to noise ratio. The compression process then proceeds through a sufficient number of stages until the reconstruction fidelity for each codevector reaches the predetermined fixed fidelity. In one embodiment the algorithm adaptively selects the codebook size at each approximate stage to yield a best compression ratio and fastest processing time. Alternatively, a same codebook size is used for each stage.

Lossy compression can be treated as lossless or near-lossless compression from the point of view of applications, if the level of noise (error) introduced by a lossy compressor is smaller than that of the intrinsic noise of the original data. In using the Fixed Fidelity mode, one can implement near lossless compression by setting the value of the fidelity threshold to be slightly less than the signal-to-noise ratio of the original data.

In another embodiment, an operating mode is used wherein the additional compression vs. fidelity is improved at each iteration to determine if another iteration will improve the fidelity for a cluster sufficiently to be warranted. Despite an increasing number of approximation stages classification processes, after a certain number of stages the reconstruction fidelity increase is very limited when compared to a decrease in the compression ratio. This point, which is referred to as an inflection point of the graph is detected, and compression proceeds automatically stage by stage until the inflection point is detected. In an additional embodiment the process adaptively selects codebook size at each stage to yield a best compression ratio and fastest processing time. Clearly, using such a process allows for a careful balance between compression ratio and fidelity.

For some data sets to be compressed, hierarchical self-orgnizing cluster vector quantisation produces many small-size clusters in the hierarchical self-organizing cluster extension process in order to provide a fidelity of the reconstructed data for each spectral cluster better than the desired fidelity. In hierarchical self-organizing cluster vector quantisation, a cluster corresponds to a codevector, which is, statistically speaking, the centre of gravity of the cluster. The spectral vectors in that cluster are all encoded by a same codevector. The larger the size of a cluster, the higher the compression ratio of the cluster since the larger group of vectors is represented by a single codevector. The overall compression ratio decreases when there are many small-size clusters. An approach of merging small-size similar clusters into a larger cluster is used in an embodiment of hierarchical self-organizing cluster vector quantisation. A cluster is treated as a small-size cluster if its size is smaller than a pre-set value. Alternatively, it is treated as a small cluster when its compression ratio is below a predetermined value. Further alternatively, when the overall compression ratio is below a predetermined value, the smallest clusters are labeled a small-size cluster. All small-size clusters are examined during the compression process. Similar small-size clusters are merged into a single larger cluster before a step of decoding is performed. Thus two small-sized clusters may be encoded by a same codevector. Only unique small-size clusters are not merged and are transmitted. This approach significantly increases the compression ratio for applications of the process resulting in many small-size clusters due to early classifications that separated similar vectors. Often, the process of merging small-size clusters results in little or no fidelity penalty. Further, if the merger process is conducted when clusters get small but before the iterative process is complete, the merger process merely regroups vectors for classification in a later stage and does not add any additional error.

Of course, numerous other embodiments may be envisaged without departing from the spirit and scope of the claimed invention.

What is claimed is:

1. A method for encoding a hyper-spectral image datacube using vector quantisation, wherein the encoded hyper-spectral data is compressed data, the method comprising the steps of:
   a) determining a codebook having a plurality of codevectors;
   b) encoding each spectral vector of the hyper-spectral data by determining a codevector within the codebook that approximates the spectral vector within the hyper-spectral data;

c) determining a fidelity of a cluster of the spectral vectors encoded with a subset of at least a codevector; and, d) when the fidelity of a cluster of spectral vectors encoded by the subset of at least a codevector is below a predetermined fidelity, determining a further codebook relating to the subset of the at least a codevector, encoding each spectral vector of the cluster of vectors encoded by at least a codevector within the subset using the further codebook, and returning to step (c).

2. A method for encoding a hyper-spectral image datacube using vector quantisation as defined in claim 1 wherein the subset of at least a codevector consists of a single codevector.

3. A method for encoding a hyper-spectral image datacube using vector quantisation as defined in claim 2 wherein the cluster of spectral vectors includes allspectral vectors encoded by the single codevector.

4. A method for encoding a hyper-spectral image datacube as defined in claim 3, comprising the steps of:

when the fidelity of spectral vectors encoded by a codevector is above a predetermined fidelity, storing that codevector in a final codebook, and storing within an index map an index indicative of the codevector's location in the final codebook.

5. A method for encoding a hyper-spectral image datacube as defined in claim 4, wherein the codevectors within the further codebook are determined based on vectors associated with the at least a codevector in the subset.

6. A method for encoding a hyper-spectral image datacube as defined in claim 1, comprising the steps of:

when the fidelity of spectral vectors encoded by a codevector is above a predetermined fidelity, storing that codevector in a final codebook, and storing within an index map an index indicative of the codevector's location within the final codebook.

7. A method for encoding a hyper-spectral image datacube as defined in claim 1, wherein the codevectors within the further codebook are determined based on vectors associated with the at least a codevector in the subset.

8. A method for encoding a hyper-spectral image datacube as defined in claim 1, wherein step a) comprises the steps of sampling a subset of vectors within the hyper-spectral data and determining a set of codevectors for reasonably approximating the sampled vectors.

9. A method for encoding a hyper-spectral image datacube as defined in claim 8, wherein sampling is performed on a small percentage of vectors within the hyper-spectral data.

10. A method for encoding a hyper-spectral image datacube as defined in claim 9, wherein the set of codevectors consists of fewer codevectors than is required to encode the datacube with the predetermined fidelity.

11. A method for encoding a hyper-spectral image datacube as defined in claim 6, wherein the codebook and the index map form a classification of the hyper-spectral datacube and, wherein the accuracy of the classification is controllable though selection of the predetermined fidelity.

12. A method for encoding a hyper-spectral image datacube using vector quantisation as defined in claim 1 comprising the step of:

predicting a convergence of the encoding steps to determine a condition for stopping execution of the steps.

13. A method for encoding a hyper-spectral image datacube using vector quantisation as defined in claim 1 comprising the step of:

predicting a convergence of the encoding steps to determine an approximate amount of resources for performing the encoding.

14. A method for encoding a hyper-spectral image datacube using vector quantisation as defined in claim 1 comprising the steps of:

selecting a group of spectral vectors from the hyperspectral data as the plurality of codevectors; and, at intervals, adding additional spectral vectors from the hyperspectral data to the plurality of codevectors.

15. A method for encoding image data using vector quantisation as defined in claim 1, wherein the further codebook is of a size different from the codebook.

16. A method for encoding image data using vector quantisation as defined in claim 1, wherein at least one of steps (a) and determining a further codebook are performed by at least one of the following: LBG, SFBBC, and MSCA.

17. A method for encoding image data using vector quantisation as defined in claim 16, wherein at least one of steps (b) and encoding each spectral vector of the cluster of vectors encoded by at least a codevector within the subset using the further codebook are performed by at least one of the following: CVQ, SFBBC, and MSCA.

18. A method for encoding image data using vector quantisation as defined in claim 1, wherein upon encoding each spectral vector of the cluster of vectors encoded by at least a codevector within the subset using the further codebook a comparison is made between an improvement in fidelity for the cluster and a compression ratio for the cluster to provide a comparison result wherein the method is halted when the comparison results are below a threshold improvement.

19. A method for encoding image data using vector quantisation as defined in claim 1, comprising the step of:

when a cluster has fewer vectors than a predetermined number of vectors, determining another cluster similar to the cluster and merging the two clusters to form one larger cluster.

20. A method for encoding image data using vector quantisation as defined in claim 1, comprising the step of:

when a compression ratio of the overall datacube is less than a predetermined compression ratio determining a cluster having approximately a fewest vectors, determining another cluster similar to the subset, and merging the two clusters to form one larger cluster.

21. A method for encoding a hyper-spectral image datacube using vector quantisation, wherein the encoded hyper-spectral data is compressed data, the method comprising the steps of:

a) determining a plurality of codevectors;

b) encoding each spectral vector of the hyper-spectral data by determining a codevector within the plurality of codevectors that approximates the spectral vector within the hyper-spectral data; and, c) repeating the steps of:

determining another plurality of codevectors relating to a subset of codevectors within a previously determined codebook, encoding each spectral vector within the hyper-spectral data that is associated with codevectors within the subset using the other plurality of codevectors, until a desired number of codevectors exist.

22. A method for encoding a hyper-spectral image datacube as defined in claim 21 wherein the codevectors are stored within a final codebook and wherein encoding of the codevectors is performed according to the step of:

storing within an index map an index indicative of the codevector within the final codebook with which a vector is encoded.

23. A method for encoding a hyper-spectral image datacube as defined in claim 22, comprising the steps of:
determining a fidelity of subsets of the encoded hyper-spectral data;
selecting subsets of codevectors associated with encoded hyperspectral data having a fidelity above a predetermined fidelity.

24. A method for encoding a hyper-spectral image datacube as defined in claim 23, comprising the steps of:
storing the selected subsets of codevectors in a final codebook, and storingwithin the index map an index indicative of the codevector's location within the final codebook.

25. A method for encoding a hyper-spectral image datacube as defined in claim 21, comprising the steps of:
determining a fidelity of subsets of the encoded hyper-spectral data;
selecting subsets of codevectors associated with encoded hyperspectral data having a fidelity below a predetermined fidelity and perfomring step (c) thereon.

26. A method for encoding a hyper-spectral image datacube as defined in claim 21, wherein the step (c) comprises the steps of:
determining a fidelity of the subset of the encoded hyper-spectral data;
when the fidelity is above a predetermined fidelity, selecting another different subset;
when the fidelity is below the predetermined fidelity performing the step of determining another plurality of codevectors relating to a subset of codevectors within the previously determined codebook, encoding each spectral vector within the hyper-spectral data that is associated with codevectors within the subset using the other plurality of codevectors.

27. A method for encoding image data using vector quantisation as defined in claim 21, wherein each subset of codevectors includes a single codevector and each single codevector has an associated set of spectral vectors encoded thereby.

28. A method for encoding image data using vector quantisation as defined in claim 27, comprising the step of:
when a set of spectral vectors has fewer vectors than a predetermined number of vectors, determining another set of spectral vectors similar to the set of spectral vectors and merging the two sets of spectral vectors to form one larger set of spectral vectors.

29. A method for encoding image data using vector quantisation as defined in claim 21, comprising the step of:
when a compression ratio of the overall datacube is less than a predetermined compression ratio determining a set of spectral vectors having approximately a fewest vectors, determining another set of spectral vectors similar to the plurality of codevectors, and merging the two sets of spectral vectors to form one larger set of spectral vectors.

30. A system for encoding a hyper-spectral image datacube using vector quantisation, wherein the encoded hyper-spectral data is compressed data, the system comprising:
a first port for receiving the hyper-spectral image data;
a processor for:
a) determining a codebook having a plurality of codevectors;
b) encoding each spectral vector of the hyper-spectral data by determining a codevector within the codebook that approximates the spectral vector within the hyper-spectral data;
c) determining a fidelity of a cluster of vectors within the encoded hyper-spectral data; and,
d) when the fidelity of a cluster of spectral vectors encoded by a codevector is below a predetermined fidelity, determining another codebook based on the cluster of spectral vectors, encoding each spectral vector of the cluster ofspectral vectors within the hyper-spectral data that is associated with codevectors within the subset using the other codebook, and returning to step (c);
memory for storing data during execution of steps a) to d); and,
a second port for providing the encoded hyper-spectral data.

31. A system for encoding a hyper-spectral image datacube using vector quantisation as defined in claim 30, wherein the processor executes the steps of:
when the fidelity of spectral vectors encoded by a codevector is above a predetermined fidelity, storing that codevector in a final codebook, and storing in the index map at locations associated with each vector encoded by the codevector an index indicative of the codevetor address within the final codebook.

32. A system for encoding a hyper-spectral image datacube using vector quantisation as defined in claim 30, wherein the memory comprises RAM.

33. A system for encoding a hyper-spectral image datacube using vector quantisation as defined in claim 30, wherein the hyper-spectral image data are encoded in real time.

34. A system for encoding a hyper-spectral image datacube using vector quantisation as defined in claim 30, wherein the first port and the second port are a same port.

35. A system for encoding a hyper-spectral image datacube using vector quantisation, wherein the encoded hyper-spectral data is compressed data, the system comprising:
a first port for receiving the hyper-spectral image data;
a processor for:
a) determining a plurality of codevectors;
b) encoding each spectral vector of the hyper-spectral data by determining a codevector within the plurality of codevectors that approximates the spectral vector within the hyper-spectral data; and,
c) repeating the steps of:
determining another plurality of codevectors based on spectral vectors within the hyper-spectral data and associated with a codevector, encoding each spectral vector within the hyper-spectral data that is associated with the codevector using the other plurality of codevectors,
until a desired number of codevectors exist within each of the pluralities of codevectors;
memory for storing data during execution of steps (a) to (c); and,
a second port for providing the encoded hyper-spectral data.

36. A system for encoding a hyper-spectral image datacube using vector quantisation as defined in claim 35, wherein the processor executes the steps of:
determining a fidelity of the encoded hyper-spectral data;
selecting subsets of codevectors associated with encoded hyper-spectral data having a fidelity above a predetermined fidelity;
storing the selected subsets of codevectors in a codebook; and,
storing within an index map indices indicative of the codevector's location within the codebook.

* * * * *